United States Patent
Weiss

(10) Patent No.: US 6,308,930 B1
(45) Date of Patent: Oct. 30, 2001

(54) REGULATING VALVE HAVING AN ESSENTIALLY HORIZONTAL STEM AND PROCESS FOR MANUFACTURING THE SAME

(75) Inventor: Josef Weiss, Varberg (SE)

(73) Assignee: J. Weiss Technic Sweden AB, Varberg (SE)

(*) Notice: Subject to any disclaimer, the term of this patent is extended or adjusted under 35 U.S.C. 154(b) by 0 days.

(21) Appl. No.: 09/403,747

(22) PCT Filed: Apr. 28, 1998

(86) PCT No.: PCT/SE98/00783

§ 371 Date: Feb. 11, 2000

§ 102(e) Date: Feb. 11, 2000

(87) PCT Pub. No.: WO98/49477

PCT Pub. Date: Nov. 5, 1998

(30) Foreign Application Priority Data

Apr. 28, 1997 (SE) .................................................. 9701591

(51) Int. Cl.$^7$ ............................. F16K 29/00; F16K 41/00
(52) U.S. Cl. ............................................ 251/86; 251/369
(58) Field of Search ........................... 251/214, 84, 86, 251/369

(56) References Cited

U.S. PATENT DOCUMENTS

| | | | |
|---|---|---|---|
| 3,100,621 | | 8/1963 | Zeitlin ................................. 251/214 |
| 3,269,698 | * | 8/1966 | Koch ................................. 251/214 X |
| 3,420,262 | * | 1/1969 | O'Neill, Jr. ....................... 251/214 X |
| 3,857,401 | * | 12/1974 | Khanin ............................. 251/369 X |
| 3,910,553 | * | 10/1975 | Boylan ............................. 251/214 X |
| 3,918,678 | * | 11/1975 | Rechtsteiner ..................... 251/214 X |
| 4,270,730 | * | 6/1981 | Hinrichs ............................... 251/214 |
| 4,273,308 | * | 6/1981 | Nakai ............................... 251/214 X |
| 4,328,974 | * | 5/1982 | White et al. ..................... 251/214 X |
| 4,398,727 | | 8/1983 | Rylander ................................. 277/3 |
| 4,773,442 | * | 9/1988 | Lephilibert ...................... 251/214 X |
| 4,922,785 | * | 5/1990 | Arnold et al. ........................ 74/567 |

FOREIGN PATENT DOCUMENTS

875290 * 8/1961 (GB) .................................... 251/214

* cited by examiner

Primary Examiner—Joseph A. Kaufman
Assistant Examiner—John Bastianelli
(74) Attorney, Agent, or Firm—Jacobson Holman, PLLC

(57) ABSTRACT

The invention relates to a regulating valve having a valve housing (1) and an essentially horizontally arranged linearly movable valve member (2) for regulating a flow through the valve. The valve member is by a cylindrical portion (22) arranged in a bearing (6) contained in the valve housing. To reduce the wear to which the bearing paths of the valve member and the bearing are subjected and, resulting therefrom, the deterioration of the guiding of the valve member, the outer bearing path of the bearing is arranged with a "bed" in the base of the bearing path. The "bed" comprises a depression (29) which is formed as a part, limited by generatrices, of a cylindrical surface having a cross-sectional radius (30) which corresponds to that of the cylindrical portion or just above and is smaller than half of a vertical diametrical dimension of this outer bearing path, and a centre angle (31) of preferably about 70°. The invention also relates to a process for manufacturing the outer bearing path.

20 Claims, 1 Drawing Sheet

REGULATING VALVE HAVING AN ESSENTIALLY HORIZONTAL STEM AND PROCESS FOR MANUFACTURING THE SAME

BACKGROUND OF THE INVENTION

The invention relates to a valve according to the preamble to claim 1 for regulating flows of gas and liquid. The valve has a movable means comprising a valve member and a valve stem, at the end of which the member is arranged, for instance, with the aid of a fixed attachment. For the regulating operation, the means provides, together with the body of the valve, the valve housing, an opening area, which can be varied by moving the means in the valve housing linearly in the longitudinal direction of the stem. This movement is controlled by a bearing arrangement contained in the valve housing and intended for the valve stem, which preferably extends through the wall of the valve housing. As a rule, the bearing arrangement consists of a cylindrical portion of the valve means and a number of bearing sleeves attached to the valve housing. The movement is effected by a positioning device, which can be a hydraulic cylinder adapted to act on the valve means. The device is preferably fixed to the other end of the stem. The valve is used, for example, in power plants and the like regulating flows of water vapour and flows of hot water with high pressures and high temperatures and is installed with its valve stem in an essentially horizontal position. The invention also relates to a process for manufacturing a bearing sleeve for the regulating valve.

DESCRIPTION OF THE RELATED ART

A valve housing of the above-mentioned type is closed relative to the surroundings. It accommodates two chambers with an intermediate wall having an opening. The valve member cooperates with this opening to provide the variable opening area. An inlet duct is connected to one of the chambers. An outlet duct is connected to the other chamber. If the valve is used to regulate the effect of a steam turbine, the inlet and outlet ducts can constitute, together with the valve housing, parts of the duct of the steam turbine for supplying steam. In many cases, this duct has for practical reasons been installed with a vertical main direction. Since valves are usually formed with the valve stem extending perpendicular to the main direction of the passing flow, many valves have their valve stem in a horizontal position. The valve stem usually has a cylindrical part, which constitutes an inner bearing path for the bearing arrangement. Known bearings have, for new or reconditioned bearings, a cylindrical outer bearing path. The diameter thereof has a constructional overdimension in relation to the inner bearing path, which depends on the accuracy of manufacture in respect of the paths, possible differences in temperature between stem and bearing etc.

The overdimension is kept as close as possible, such that only a minimum amount of steam leaks out from the valve housing through the bearing gap formed between the bearing and the stem. This steam often has pressures which are very high and may exceed 60 atm. gauge.

Anyhow, the overdimension must be so great that the stem is positioned in a base, the diameter of which is so much greater than that of the stem that the stem engages linearly in the bearing. Since the weight of the stem, with the addition of the weights of the valve member and parts of the positioning device, thus causes high surface pressures acting on the bearing surface, wear arises. By choosing predetermined combinations of materials for the stem and the bearing, the wear can essentially be limited to the bearing, which is desirable since it is less expensive to recondition the bearing compared with the stem. It is true that moist steam penetrates between the bearing surfaces, but a supporting film which reduces the wear cannot be obtained as is the case with continuously rotating bearing arrangements.

As mentioned above, the valve is mechanically connected to the turbine by a conduit. To prevent unnecessary flow losses, one tries to keep the conduit as straight and short as possible. Vibrations of the turbine will therefore propagate to the valve housing and the bearing without much reduction. The wear caused by the great surface pressure will be increased to a considerable extent by the fact that the stem, owing to its undefined position in the base of the bearing, will move around in the base owing to the vibrations. Wear is caused by the continuous rolling of the stem on the surfaces of the bearing and motions in the base of the surface. Moreover, fragments will be released especially from the outer bearing path owing to the choice of the combination of materials described above. This wear is increased by the fragments acting as an abrasive between the bearing surfaces. The wear causes a growth of the gap between the upper part of the bearing and the stem. The increasing amount of steam leaking through this gap will later on necessitate reconditioning of the stem and the bearing, for instance, by grinding the stem and exchanging the bearings.

BRIEF SUMMARY OF THE INVENTION

The object of the invention is to provide a valve, as mentioned by way of introduction, with improved guiding of the stem. By means of the valve, the wear in the bearing and, thus, the leakage through this bearing will be reduced to a considerable extent.

This object is achieved by the valve being given the distinctive features that appear from the appended claims.

According to the invention, the bearing is arranged with a "bed" for the stem in the base of the bearing. The "bed" should give the stem a defined position in the bearing, thereby preventing as far as possible the stem from moving and rolling. The "bed" can be a depression formed as a part, limited by generatrices, of a cylindrical surface with a cross-sectional radius corresponding to that of the stem or just above. As a result, the surface pressure between the bearing surface is reduced by the engagement spreading over a much larger surface. A surface engagement is then obtained instead of the linear engagement of the prior-art bearing. Since it is possible to essentially prevent the movement of the stem and to reduce the surface pressure, the bearing is subjected to much less wear in a valve according to the invention. The depth of the "bed" should be so great as to prevent movement of the stem. According to the invention, it is proposed that the depth, measured with a centre angle, shown in cross-section, between said limiting generatrices, be determined to be at lest about 45° so as to prevent movement of the stem and obtain a sufficient contact surface. The angle should not exceed about 160°, since otherwise the clearance between the stem and the bearing will be too small. When the angle is close to 180°, a drawer effect may arise and cause locking of the stem. A suitable valve of the angle is about 70°, which is used in the preferred embodiment. The maximum diametrical dimension of the outer bearing path is suitable the same as for prior-art bearings.

When the stem is at rest, the inner bearing surface, in bearing arrangements of the present type, will be caused by gravity to lie in the base of the outer bearing surface. Between the uppermost part of the inner bearing surface, the stem, and the outer bearing surface, the hole, a clearance is necessary, the size of which depends on the possible differences in temperature that may arise in the bearing arrangement, soot deposits on the bearing surfaces, surface irregularities therein etc. For a predetermined use, this size of the clearance is made to be essentially proportional to the diameter of the stem.

For a stem with a diameter of 70 mm, use is made, for valves of the type of the preferred embodiment, of a clearance of about 0.3 mm when the bearing arrangement has not been worn. The differences in temperature in the bearing arrangement may arise, for instance, as steam is supplied when starting the turbine, which means that hot steam heats the valve member and, thus, the stem much quicker and much more than the outer part of the bearing arrangement. Furthermore the latter is kept cooler by good carrying off to heat to the other part of the valve housing.

In known bearing arrangements, cylindrical outer bearing surfaces with a diameter corresponding to that of the stem with the addition of said clearance have been chosen. The clearance has thus also been allowed to determine the radius in the base of the hole. This radium has become so much greater than that of the stem that the movement of the stem as described above and the great surface load have been obtained. According to the invention, it is therefore suggested that lower part of the outer bearing surface, in which the stem rests, be given a radium which is smaller than half of the above-mentioned diametrical dimension, which corresponds to the diameter of the stem with the addition of a clearance as is normal in the context, usually the vertical diametrical dimension of the outer bearing path of the invention. According to the invention, the normal clearance is chosen in the same way as for known bearing arrangements.

As stated above, the base of the outer bearing path should have a radius corresponding to that of the cylindrical portion or just above. In a preferred embodiment, use has been made of an ISO tolerance with the degree h6 for the stem and the degree H7 for the base of the hole. With a stem diameter of 70 mm this means that the tolerance range is, for the radius of the stem, between about −10 $\mu$m and 0 $\mu$m, and for the radius of the base of the hole, between 0 $\mu$m and 15 $\mu$m. The base then has a radius which is from that of the cylindrical portion up to 0.025 mm (10 $\mu$m+15 $\mu$m) above that, whereas half said diametrical dimension is the radius of the cylindrical portion with half the clearance added, i.e; 0.15 mm. In this case, the radius of the base thus is between 0.125 mm (0.15−0.025) and 0.15 mm smaller than half the diametrical dimension. The tolerances of this dimension are not taken into consideration.

According to the invention, there is also provided a process for manufacturing the outer bearing path as suggested above. The entire valve or a part thereof which is to comprise this outer bearing path, for instance, a valve housing end wall or a bearing sleeve, is fitted in a machine tool, such as a lathe or a mil ling machine, whereupon a cylindrical basic hole is made. Subsequently, the part in this fitting is translationally moved in the machine, and a part-cylindrical recess is made, which extends from the basic hole into the surrounding material, for instance, the bearing sleeve. The bearing surface can be made in such a manner that the longitudinal axis of either the basic hole or the part-cylindrical recess coincides with the axis of a rotary motion of the worked object in the machine tool. A bearing sleeve is fitted, preferably with its outer surface concentric with this axis of rotation. If the axis of the recess is made to coincide with the axis of the rotary motion, the theoretically optimal guiding of the movement of the stem should, as is mostly the case, be obtained in respect of the cooperation of the valve member described above with the valve housing. In the preferred embodiment, the longitudinal axis of the basic hole is, however, made to coincide with the axis of rotation. The basic hole normally forms the surface above the hole base. It goes without saying that, alternatively, this hole can form the hole base proper.

According to the invention, simple means are achieved for reducing the wear to which the valve bearing and the stem are subjected. For, for instance, a valve corresponding to the prior-art valve of the preferred embodiment with a stem diameter of 70.0 mm, the bearing has a diameter of 70.3 mm. In the time, during which the wear has been checked, the clearance has increased from 0.3 to 0.6 mm. The guiding of the movable element has then become impaired, such that the valve has become more sensitive to vibrations and the flow of the leaking steam has become so great that it has been considered necessary to recondition the bearings and the stem.

According to the invention, the shape of the hole, apart from the lower part, the "bed", is not bound as long as there is sufficient clearance. For the preferred embodiment, use is made of a part-cylindrical shape of the hole also above the mentioned generatrices with a centre angle of 70°. This shape of the the hole thus has generatrices which are shared by the "bed" and has such a radius that the vertical diameter of the hole corresponds to said maximum diametrical distance. From experience it is known that during said time the clearance will increase, owing to wear, from 0.3 to 0.4 mm only, which implies that the reconditioning of the bearing arrangement is not necessary with the same frequency. A further advantage is that the service life of the entire valve is extended since the valve is less sensitive to vibrations and the cost of steam leakage is reduced.

BRIEF DESCRIPTION OF THE DRAWINGS

A preferred embodiment will now be described in more detail with reference to the accompanying figures, the reference numerals of which designate equivalent parts.

DETAILED DESCRIPTION OF THE PREFERRED EMBODIMENTS

Figure 1:
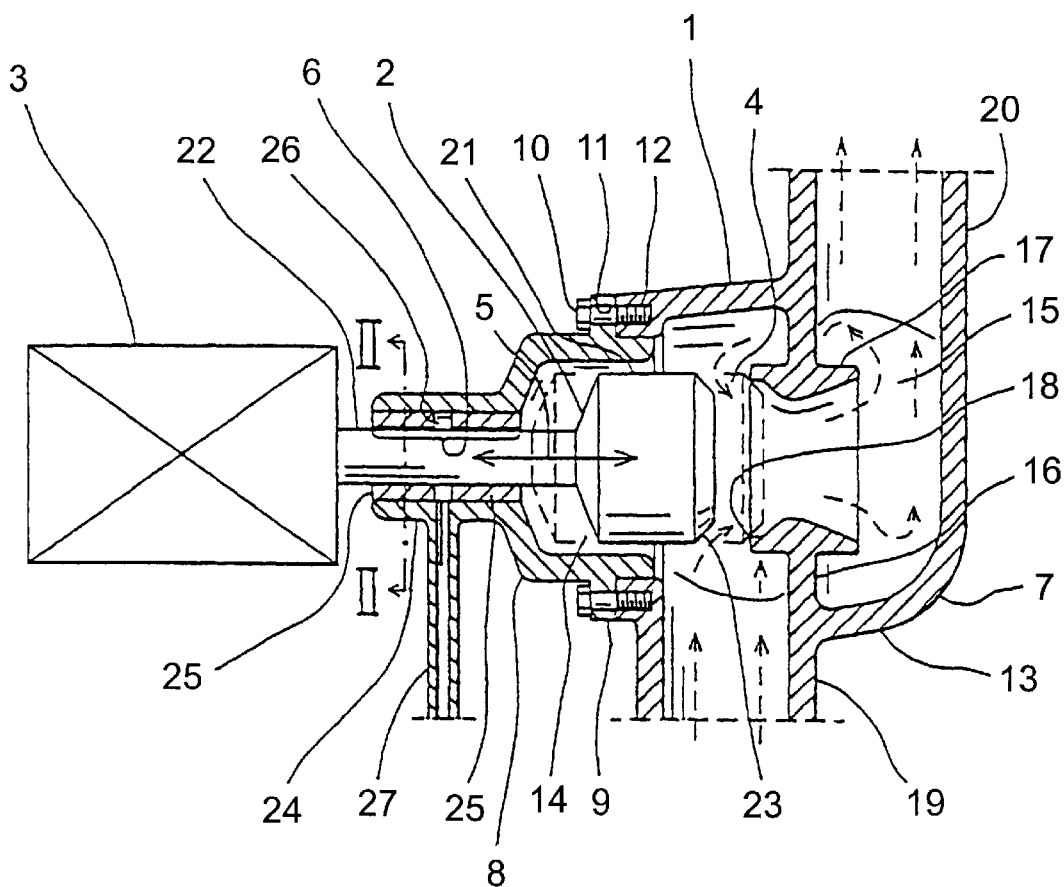
FIG. 1 is a longitudinal section of an inventive valve for regulating and closing a steam flow to a steam turbine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The valve housing, which serves as a body and a duct closed to the surroundings, consists essentially of a valve chest 7 and a valve housing end wall 8 fitted with the bearing 6. The end wall is fixed, by means of a flange 9 coaxial with the bearing, to the valve chest with the aid of bolts 10. The bolts are inserted in through flange holes 11 and screwed into threaded holes 12 of the valve check, uniformly distributed around the flange.

The valve chest, which is the main part of the valve housing, is like the valve housing end wall designed as a shell of cast steel. The steel 13 of the valve check forms walls for an inlet chamber 14 and an outlet chamber 15. A wall 16 shared by the chambers has an opening formed as the hole of a rotationally symmetrical nozzle tube 17 which is coaxial with the bearing 6. The nozzle tube extends a distance into the inlet chamber as well as the outlet chamber. That part of the nozzle tube which extends into the inlet chamber is terminated with a slightly rounded, inner annular edge 18, which is that part of the valve housing which cooperates with the movable valve means 2 for regulating the flow of steam. The shell of the valve chest also forms an inlet tube 19 and an outlet tube 20. These vertically arranged tubes are connected to the inlet chamber 14 and the outlet chamber 15, respectively. The latter tube is directly connected with the steam intake pipe of the turbine.

The rotationally symmetrical movable valve means 2 comprises essentially a valve member 21 and a cylindrical valve stem 22, at one end of which the valve member is fixed. The valve member is formed as a cylinder whose outer terminal edge is bevelled to form a truncated conical surface 23, which is that part of the movable valve means which cooperates with the annular edge 18 of the nozzle. The valve means that can be moved linearly between the end positions of the valve member, which are indicated in the drawing.

The other end of the valve stem is connected to the positioning device 3. This can be an electric motor with a gear wheel meshing with a gear rack which constitutes an extension of the valve stem. In the preferred embodiment, the device, however, is a hydraulic driving cylinder, whose driving piston is attached to the valve stem. The driving cylinder is fixed to the valve housing by means of a holder (not shown).

The shell of the valve housing end wall 8 is formed as a cup which accommodates the valve member. At the edge of the cup, the flange 9 is connected. From the bottom of the cup, the end wall shell projects in a tubular manner to form a mounting 24 for a pair of bearing sleeves 25, which are used as bearings and which are inserted with a press fit into the mounting.

With a view to preventing steam from leaking into the turbine hall, the bearing is formed with a suction space 26 for leaking steam. The space, which is placed between the two bearing sleeves, is connected, by the intermediary of a duct in a suction tube 27, to a system for the power plant's recovery of leaking steam.

Figure 2:
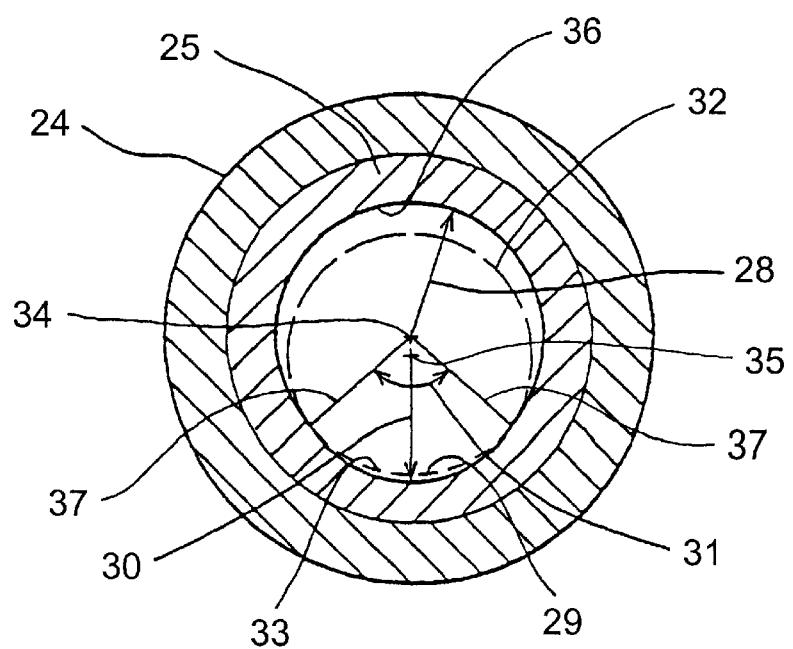
FIG. 2 is a sectional view II—II from FIG. 1 through the bearing of the valve stem and the surrounding part of the valve housing.

As shown in FIG. 2, the bearing path of the present invention includes two surfaces, the first surface 29, which is the "bed" or supporting surface, and a second surface 36. The first surface 29 is a part of a cylindrical surface represented by the dotted line 32 with the center and the radius 30. The first surface is limited by a pair of generatrices 37. The second surface 36 is a part of a cylindrical surface with the center 34 and the radius 28. The dotted line 33 represents the continuation of cylindrical surface 36.

The bearing path of each bearing sleeve is made by turning in a lathe in two steps. For the preferred embodiment with a stem diameter of 70.0 mm, first a hole with the radius 28, R=35.1 mm, the center 35 and the circumference 33, 36, is turned, which is concentric with the outer surface of the sleeve. Then the sleeve is given an eccentricity of such an extent in its fitting in the lathe that a longitudinal depression 29 of 0.03 mm, which is symmetrical with a vertical plane, is obtained at the lowermost part of the bearing path, when turning with a radius 30, which exceeds the radius of the stem by about 0.01 mm, the center 35 and the circumference 29, 32. A "bed" or supporting surface for the valve stem is then obtained, which has a center angle 31 of about 70°.

In the preferred embodiment, a cylindrical valve stem 22 is shown, which cooperates with a pair of bearing sleeves 25 with equally large holes. However, the stem could be stepped with at least two concentric subsequent cylinders with different diameters, in which case the bearing sleeves would have holes of corresponding sizes according to the invention. The embodiment also shows a valve with a simple function. With a view to securing the possibility of quickly stopping the flow of steam to the turbine, for instance, in case of disturbance in the current supply of the generator, this kind of valves is in many cases fitted with a special movable valve means for this function. Also this means is then suitably arranged according to the invention.

This invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A regulating valve comprising a valve housing and an essentially horizontally arranged, linearly movable valve member for regulating a flow through the valve, the valve member having a stem with a cylindrical portion and arranged with the cylindrical portion in a bearing path contained in the valve housing, the bearing path including a first surface in a base of the bearing path formed as a part of a cylindrical surface limited by a pair of generatrices and having in cross section a first radius which is equal to or slightly greater than a radius of the cylindrical portion and which is shorter than half of a diametrical dimension of the bearing path, said first surface forming a supporting surface for the cylindrical portion, and a second surface arranged above the first surface and bridging the first surface, wherein a center angle between the limiting generatrices of the first surface is between 45° and 160°.

2. The regulating valve as claimed in claim 1, wherein the second surface is a part, limited by a pair of generatrices, of a cylindrical surface having in cross section a second radius with a center point that is placed a distance above a center point of the first radius.

3. The regulating valve as claimed in claim 1, wherein the center angle between the limiting generatrices is about 70°.

4. The regulating valve as claimed in claim 1, wherein a length of the first radius exceed the radius of the cylindrical portion of about 0.01 mm.

5. A process for manufacturing a regulating valve having a valve housing and an essentially horizontally arranged, linearly movable valve means for regulating a flow through the regulating valve, the valve means having a stem with a cylindrical portion and arranged with the cylindrical portion in a bearing path contained in the valve housing, the bearing path including a first surface in a base of the bearing path formed as a part of a cylindrical surface limited by a pair of generatrices and having in cross section a first radius which is equal to or slightly greater than a radius of the cylindrical portion and which is shorter than half of a diametrical dimension of the bearing path, and a second surface arranged above the first surface and bridging the first surface, wherein a center angle between the limiting generatrices of the first surface is between 45° and 160°, the process comprising the steps of making in the valve housing, in which the outer bearing surface is arranged, a cylindrical basic hole in a machine tool, said cylindrical basic hole defining the second surface; and translationally moving the valve housing in its fitting in the machine tool and making a part-cylindrical recess which extends from the basic hole into the base of the bearing path between the limiting generatrices to define the first surface.

6. The process as set forth in claim 5, wherein the stem has a diameter of approximately 70.0 mm, the basic hole has a radius of approximately 35.1 mm, and the part-cylindrical recess is about 0.3 mm in depth symmetrical with a vertical plane.

7. The process as set forth in claim 5, wherein the step of making the basic hole includes making the basic hole in a bearing sleeve of said housing, said basic hole being concentric with an outer surface of said bearing sleeve.

8. A regulating valve with a bearing sleeve defining a non-cylindrical bearing path for accommodating a cylindrical portion of an essentially horizontally arranged, linearly movable valve stem, the bearing sleeve having an inner surface and comprising:

a first surface, located in a base of the bearing path, formed as a part of a first cylindrical surface limited by a pair of generatrices and having in cross section a first radius which is equal to or slightly greater than a radius of the cylindrical portion and which has a length less than half of a diametrical dimension of the bearing path, said first surface forming a bed for said cylindrical portion; and a second cylindrical surface having a center point located above a center point of said first cylindrical surface and bridging the first surface, said second cylindrical surface extending over a major portion of said inner surface except in the base portion where the bed of said first surface forms a depression in said inner surface, such that a distance between an uppermost point on said inner surface and a lowermost point in said depression is greater than a greater width of said bearing path measured substantially perpendicular to said distance.

9. The regulating valve as claimed in claim 8, wherein a center angle between the limiting generatrices of the first surface is between 45° and 160°.

10. The regulating valve as claimed in claim 9, wherein the center angle between the limiting generatrices is about 70°.

11. The regulating valve as claimed in claim 8, wherein the first radius exceed this radius of the cylindrical portion by about 0.01 mm.

12. The regulation valve as set forth in claim 8, wherein said second cylindrical surface is concentric with an outer surface of said bearing sleeve.

13. A regulating valve with a bearing sleeve defining a non-cylindrical bearing path for accommodating a cylindrical portion of an essentially horizontally arranged, linearly movable valve stem, the bearing sleeve having an inner surface and comprising:

a first cylindrical surface larger than said cylindrical portion of said valve stem and extending over a major portion of said inner surface; and a second cylindrical surface in a minor portion of said inner surface which as a radius less than a radius of said first surface and which substantially corresponds to said cylindrical portion of said valve stem, said second cylindrical surface forming a depression in said inner surface such that the bearing path is non-cylindrical.

14. The regulating valve as claimed in claim 13, wherein the second radius exceeds a radius of the cylindrical portion by about 0.01 mm.

15. The regulating valve as set forth in claim 13, wherein said first cylindrical surface is concentric with an outer surface of bearing sleeve.

16. The regulating valve as set forth in claim 13, wherein the second cylindrical surface is limited by two generatrices and a center angle between the two generatrices is between 45° and 160°.

17. A regulating valve comprising:

a valve housing;

an essentially horizontally arranged, linearly movable, substantially cylindrical valve stem having a valve stem radius; and a bearing sleeve in said valve housing for accommodating said valve stem, said bearing sleeve including an inner surface formed by first and second substantially cylindrical surfaces, said first surface having a first radius larger than said valve stem radius, and said second surface having a second radius smaller than said first radius and equal to or slightly larger than said valve stem radius, center points of said first and second radii being offset such that said second surface forms a depression in said first surface whereby said inner surface in non-cylindrical.

18. The regulating valve as claimed in claim 17, wherein the second radius exceeds the valve stem radius by about 0.01 mm.

19. The regulating valve as set forth in claim 17, wherein said first cylindrical surface is concentric with an outer surface of said bearing sleeve.

20. The regulating valve as set forth in claim 19, wherein the second cylindrical surface is limited by two generatrices and a center angle between the two generatrices is between 45° and 160°.

* * * * *